United States Patent
Kato et al.

(10) Patent No.: US 9,035,533 B2
(45) Date of Patent: May 19, 2015

(54) PASTE AND POLYMER TRANSDUCER INCLUDING COATING FILM FORMED FROM SAME AS ELECTROLYTE FILM OR ELECTRODE FILMS

(75) Inventors: Toshinori Kato, Tsukuba (JP); Katsuei Takahashi, Tsukuba (JP); Takashi Yamashita, Tsukuba (JP)

(73) Assignee: KURARAY CO., LTD., Kurashiki-shi (JP)

( * ) Notice: Subject to any disclaimer, the term of this patent is extended or adjusted under 35 U.S.C. 154(b) by 266 days.

(21) Appl. No.: 13/825,727

(22) PCT Filed: Sep. 21, 2011

(86) PCT No.: PCT/JP2011/071489
§ 371 (c)(1),
(2), (4) Date: Mar. 22, 2013

(87) PCT Pub. No.: WO2012/039425
PCT Pub. Date: Mar. 29, 2012

(65) Prior Publication Data
US 2013/0175899 A1    Jul. 11, 2013

(30) Foreign Application Priority Data
Sep. 24, 2010   (JP) .................... 2010-214099

(51) Int. Cl.
*H01G 9/025*     (2006.01)
*C09D 5/24*      (2006.01)
(Continued)

(52) U.S. Cl.
CPC ............... *H01G 9/025* (2013.01); *C09D 5/24* (2013.01); *C09D 7/001* (2013.01); *C09D 7/1283* (2013.01);
(Continued)

(58) Field of Classification Search
USPC .................. 310/300, 800; 252/62.2
See application file for complete search history.

(56) References Cited

U.S. PATENT DOCUMENTS 4,933,479 A * 6/1990 Kotaka et al. ............ 558/199
5,789,106 A * 8/1998 Rosenmeier et al. ....... 429/492
(Continued)

FOREIGN PATENT DOCUMENTS

JP   6 6991        1/1994
JP   2001 210336   8/2001
(Continued)

OTHER PUBLICATIONS

Asaka, K. et al., "Expected Materials for the Future," vol. 5, No. 10, pp. 14 to 19, (2005).
(Continued)

*Primary Examiner* — Thanh Lam
(74) *Attorney, Agent, or Firm* — Oblon, Spivak, McClelland, Maier & Neustadt, L.L.P.

(57) ABSTRACT

Paste which is prepared by any solid concentration and is excellent in terms of handleability, applicability, and storage stability; an electrolyte film or electrode film which is an even and highly flexible coating film formed in a desired thickness from the paste through a few repetitions of an application/drying step; and a polymer transducer which can be industrially and economically produced and shows excellent performance. The paste comprises: a solid polyelectrolyte (A) consisting of a block copolymer containing; a polymer block (a-1) which is represented by chemical formula (1)

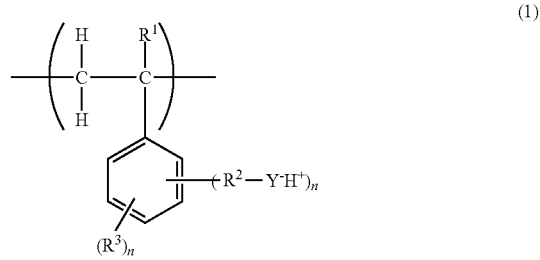

(1)

and a polymer block (a-2) which has substantially no ionic group and is rubbery at room temperature; an organic solvent (B) having a boiling point at 150° C. or higher; and non-dissociable particles (C) which are insoluble in the organic solvent (B) and have a major-axis length of 1-100 μm and an aspect ratio of 5 or less. The polymer transducer comprises an electrolyte film and a pair of electrode films between which the electrolyte film is sandwiched, wherein the electrolyte film or the pair of electrode films has been formed by drying and solidifying the paste into a film shape.

9 Claims, 2 Drawing Sheets

(51) Int. Cl.
  *C09D 7/00*   (2006.01)
  *C09D 7/12*   (2006.01)
  *H02N 1/00*   (2006.01)
  *H01B 1/12*   (2006.01)
  *H01B 1/22*   (2006.01)
  *H01B 1/24*   (2006.01)
  *C08F 8/36*   (2006.01)
  *C09J 153/02* (2006.01)

(52) U.S. Cl.
  CPC ............... C09D 7/1291 (2013.01); H02N 1/00 (2013.01); H01B 1/122 (2013.01); H01B 1/22 (2013.01); H01B 1/24 (2013.01); C08F 8/36 (2013.01); C09J 153/025 (2013.01); *Y10S 310/80* (2013.01)

(56) References Cited

U.S. PATENT DOCUMENTS

| | | | |
|---|---|---|---|
| 8,446,075 B2* | 5/2013 | Takahashi et al. | 310/364 |
| 2005/0046313 A1* | 3/2005 | Basheer et al. | 310/800 |
| 2005/0103706 A1 | 5/2005 | Bennett et al. | |
| 2006/0266642 A1 | 11/2006 | Akle et al. | |
| 2008/0014505 A1 | 1/2008 | Kato et al. | |
| 2008/0254338 A1 | 10/2008 | Uehara et al. | |
| 2009/0123804 A1 | 5/2009 | Yamashita et al. | |
| 2009/0127491 A1* | 5/2009 | Kakiuchi et al. | 252/62.2 |
| 2012/0104308 A1* | 5/2012 | Okamoto et al. | 252/62.2 |
| 2012/0241689 A1* | 9/2012 | Itou et al. | 252/511 |
| 2013/0049530 A1* | 2/2013 | Koo et al. | 310/300 |

FOREIGN PATENT DOCUMENTS

| | | |
|---|---|---|
| JP | 2003 142125 | 5/2003 |
| JP | 2006 210326 | 8/2006 |
| JP | 2007 336790 | 12/2007 |
| JP | 2008 248116 | 10/2008 |

OTHER PUBLICATIONS

Fukushima, T. et al., "Fully Plastic Actuator through Layer-by-Layer Casting with Ionic-Liquid-Based Bucky Gel," Angewandte Chemie International Edition, vol. 44, pp. 2410 to 2413, (2005).

Kim, K. et al., "A novel method of manufacturing three-dimensional ionic polymer-metal composites (IPMCs) biomimetic sensors, actuators and artificial muscles," Polymer, vol. 43, pp. 797 to 802, (2002).

International Search Report Issued Dec. 20, 2011 in PCT/JP11/71489 Filed Sep. 21, 2011.

* cited by examiner

PASTE AND POLYMER TRANSDUCER INCLUDING COATING FILM FORMED FROM SAME AS ELECTROLYTE FILM OR ELECTRODE FILMS

TECHNICAL FIELD

The present invention relates to a paste which is useful as a material for forming an electrolyte film and an electrode film and to a polymer transducer comprising a coating film formed from the paste as the electrolyte film or the electrode film.

BACKGROUND ART

Recently, in a field of medical instruments, micro machines, etc., a need for small-size and lightweight sensors and transducers which transform a certain kind of energy into another one is increasing. In addition, in a field of industrial robots, personal robots, etc., a need for lightweight and flexible transducers is also increasing.

As described above, polymer transducers are attracting attention in various fields, as they are lightweight and flexible. Various polymer transducers have been reported.

For example, Patent Document 1 described below, discloses a small-sized and flexible actuator device comprising: a cation exchange film, and electrodes each is attached to a respective surface of the ion exchange film. In Patent Document 2, the present inventors disclose a polymer transducer having an excellent flexibility formed from a solid polymer electrolyte component having a specific molecular structure. The inventions described in both Patent Documents 1 and 2 have a structure in which at least a pair of electrode layers is provided with respect to a solid polymer electrolyte. The inventions have a lamination structure in which the electrode layer is formed on a solid polymer electrolyte using electroless plating technique.

In Patent Documents 3 and 4, a polymer transducer is disclosed, which has an electrode layer comprising a solid polymer electrolyte and conductive fine particles. In operation of the polymer transducer, formation of an electric double layer plays an important role at an interface between the solid polymer electrolyte and a conductive substance such as dendritic metal formed by electroless plating method, metal fine particles, carbon fine particles, etc. In order to form more electric double layers, methods for forming them with such compositions have been adopted.

Electroless plating methods are generally carried out by repeating several times of noble-metal doping and reduction by a reducing agent, being unsuitable for industrial production. However, Patent Documents 3 and 4 and non-Patent Documents 1 to 3, disclose a composition comprising a solid polymer electrolyte and conductive fine particles those of which are dissolved or dispersed in an appropriate media to obtain a liquid or a paste. From the obtained liquid or paste, an electrode film is formed. These processes are expected to be industrially and economically feasible.

In a case where a polymer transducer is produced using this paste and printing techniques, the electrode film should be formed to have a certain film thickness so as to form more electric double layers. As for an electrolyte film, a certain film thickness is required to surely and electronically insulate the opposing electrode films from each other. A desired film thickness of these electrode film and electrolyte film can be achieved generally by using a paste with a high solid content concentration and by adopting a multiple repetitions of a coating and drying steps. However, there are such problems as a sharp rise in the viscosity of the paste due to an increase in the solid content concentration, and as an increase in manufacturing costs, etc. As seen above, the conventional pastes have still disadvantages in adjusting the solid content concentration, storage stability, handling ability, coatability, etc. A paste with excellent practicality has been desired.

PRIOR ART DOCUMENT

Patent Document

[Patent Document 1] Japanese Patent Publication H06-6991A

[Patent Document 2] Japanese Patent Publication 2007-336790A

[Patent Document 3] US Patent Publication 2005/0103706A

[Patent Document 4] US Patent Publication 2006/0266642A

[Non Patent Document 1] Future Material vol. 5, No. 10, p 14-19, (2005)

[Non Patent Document 2] Angewandte Chemie International Edition, vol. 44 p 2410-2413 (2005)

[Non Patent Document 3] Polymer vol. 43, p 797-802, (2002)

SUMMARY OF THE INVENTION

Problems to be Solved by the Invention

The present invention is made to solve the problems mentioned above, and to provide: a paste which can be prepared so as to have high solid content concentration and is excellent in terms of handling ability, coatability, and storage stability; an electrolyte film or electrode film which is an even and highly flexible coating film formed in a desired thickness from the paste through a few repetitions of coating/drying steps; and a polymer transducer which shows excellent performance and can be industrially and economically produced.

Means to Solve the Problems

As a result of extensive studies being made by the present inventors, the inventors find out a paste, which comprises specific particles, for forming an electrolyte and an electrode, both of which can be suitably used for a polymer transducer. They also find out that a coating film being obtained by drying the paste and a polymer transducer being obtained from the coating film has an excellent performance. Thus the present invention has been completed.

Claim 1 of the present invention, which is made to achieve the objects mentioned above, relates to a paste which comprises:

a solid polymer electrolyte (A) consisting of a block copolymer containing;

a polymer block (a-1) having a unit represented by following formula (1)

(in the formula, $R^1$ is a hydrogen atom, a linear or branched alkyl group having a carbon number of 1-8, or an aryl group having a carbon number of 6-14; $R^2$ is an alkylene group having a carbon number of 1-10, an arylene group having a carbon number of 6-14 which may have 1-3 substituents, or a polyalkylene glycol group which may have a substituent, or direct bonding; $R^3$ is an alkyl group or alkoxy group having a carbon number of 1-4; an anion $Y^-$ which corresponds to the hydrogen ion $H^+$ is connected to an aromatic ring by way of $R^2$; n=1-3, m=0-4, and 1≤m+n≤5), and a rubber-like, at a room temperature, polymer block (a-2) having substantially no ion group;

an organic solvent (B) having a boiling point of 150° C. or higher; and non-dissociable particles (C) which is insoluble in the organic solvent (B) and has a major axis of 1-100 μm and an aspect ratio of 5 or less.

Claim 2 of the present invention relates to the paste according to Claim 1, wherein the anion $Y^-$ is selected from a carboxylic acid anion, sulfonic acid anion and phosphoric acid anion.

Claim 3 of the present invention relates to the paste according to Claim 1, wherein the non-dissociable particles (C) is non-dissociable polymer particles.

Claim 4 of the present invention relates to the paste according to Claim 1, wherein the non-dissociable particles (C) is selected from particles of a crystalline polymer, particles of a cross-linked polymer and inorganic particles.

Claim 5 of the present invention relates to the paste according to Claim 1, wherein the paste contains conductive fine particles (D) whose average particle diameter is 1/50 times or less the length of the major axis of the non-dissociable particles (C).

Claim 6 of the present invention relates to the paste according to Claim 5, wherein the conductive fine particles (D) is selected from metal fine particles, metal compound fine particles, conductive carbon fine particles and a powder of a conductive polymer.

Claim 7 of the present invention relates to an electrolyte film being formed into a film-like shape by drying and solidifying the paste according to Claim 1.

Claim 8 of the present invention relates to an electrode film being formed into a film-like shape by drying and solidifying the paste according to Claim 5.

Claim 9 of the present invention relates to a polymer transducer comprises:

at least one electrolyte film; and at least a pair of electrode films between which the electrolyte film is sandwiched, wherein at least either one of the electrolyte film and the electrode film that contains conductive fine particles (D) is a coating film produced by drying and solidifying a paste which comprises:

a solid polymer electrolyte (A) consisting of a block copolymer containing; a polymer block (a-1) having a unit represented by following formula (1)

(in the formula, $R^1$ is a hydrogen atom, a linear or branched alkyl group having a carbon number of 1-8, or an aryl group having a carbon number of 6-14; $R^2$ is an alkylene group having a carbon number of 1-10, an arylene group having a carbon number of 6-14 which may have 1-3 substituents, or a polyalkylene glycol group which may have a substituent, or direct bonding; $R^3$ is an alkyl group or alkoxy group having a carbon number of 1-4; an anion $Y^-$ which corresponds to the hydrogen ion $H^+$ is connected to an aromatic ring by way of $R^2$; n=1-3, m=0-4, and 1≤m+n≤5), and a rubber-like (at a room temperature) polymer block (a-2) having substantially no ion group;

an organic solvent (B) having a boiling point of 150° C. or higher; and non-dissociable particles (C) which is insoluble in the organic solvent (B) and has a major axis of 1-100 μm and an aspect ratio of 5 or less.

Advantageous Effects of the Invention

According to the present invention, a paste which has a high solid content concentration and is excellent in terms of handling ability and coatability can be easily prepared. Further, a solid polymer electrolyte (A), a component of the paste, is dissolved or dispersed evenly in the paste. This state can be preserved for a long period of time (excellent storage stability). Due to this state in which the solid polymer electrolyte (A) is dissolved or dispersed stably, an electrolyte film which is a homogeneous coating film can be obtained by coating (or applying) and drying the paste. Further, an electrode film can be formed when conductive fine particles (D) is contained in the paste.

The electrolyte film and the electrode film of the present invention are homogeneous ones and have an excellent flexibility and ductility. The electrolyte film and the electrode film having a desired thickness can be produced with high productivity and at reasonable cost through a fewer repetitions of a coating/drying steps. The electrolyte film and the electrode film can be preferably used, no matter what shape they are, as an electrolyte and an electrode of the polymer transducer.

The polymer transducer of the present invention can be produced without using a complex step from the paste having an excellent performance, and shows high responsiveness due to its excellent flexibility.

EXPLANATION OF NUMERAL

1: polymer transducer
1A: sensor unit
2: electrolyte layer
3a, 3b: electrode layer
4a, 4b: collector electrode
5a, 5b: film substrate
11a, 11b: clip
12a, 12b: lead wire
13: displacement generating unit
13a: drive transmission member
13b: vibration plate
14: Laser displacement meter
P: displacement point

PREFERRED EMBODIMENT OF THE PRESENT INVENTION

Preferred embodiments of the present invention will be precisely explained below, but the scope of the present invention should not be limited to these embodiments.

The paste of the present invention is preferably used as a material for forming an electrolyte film and an electrode film both of which are used for the polymer transducer.

A paste suitable for forming the electrolyte film of the present invention comprises a solid polymer electrolyte (A), an organic solvent (B) having a boiling point of 150° C. or over, non-dissociable particles (C) which is insoluble in the organic solvent (B) and has a major axis of 1-100 μm and an aspect ratio of not more than 5.

In the formula (1), as a linear or branched alkyl group having a carbon number of 1-8, which can be $R^1$, exemplified is an alkyl group such as methyl group, ethyl group, propyl group, iso-propyl group, butyl group, iso-butyl group, sec-butyl group, tert-butyl group, pentyl group, neo-pentyl group, hexyl group, octyl group, 2-ethylhexyl group, etc. As an aryl group having a carbon number of 6-14 which can be $R^1$, phenyl group, naphtyl group, anthranil group, biphenyl group, etc. can be exemplified.

In the formula (1), as an alkylene group having a carbon number of 1-10, which can be $R^2$, methylene group, ethylene group, propylene group, butylene group, etc. can be exemplified. Further, as an arylene group having a carbon number of 6-14 which may have 1-3 substituents, which can be $R^2$, for example, a phenylene group which may have 1-3 substituents can be exemplified. Further, as a polyalkylene glycol group which may have a substituent, which can be $R^2$, for example, poly ethyleneglycol group which may have a substituent can be exemplified.

In the formula (1), as a substituent which may be held by $R^2$, exemplified are an alkyl group such as methyl group, ethyl group, propyl group, iso-propyl group, butyl group, iso-butyl group, sec-butyl group, tert-butyl group, pentyl group, neo-pentyl group, hexyl group, octyl group, 2-etylhexyl group, etc.; and alkoxy group such as methoxy group, ethoxy group, iso-propoxy group, tert-butoxy group, methyl ethoxy group, ethyl ethoxy group, etc.

In the formula (1), as an alkyl group having a carbon number of 1-4 which can be $R^3$, for example, methyl group, ethyl group, propyl group, iso-propyl group, butyl group, iso-butyl group, sec-butyl group, tert-butyl group, etc. can be exemplified. Further, as an alkoxy group having a carbon number of 1-4, which can be $R^3$, for example, methoxy group, ethoxy group, propoxy group, iso-propoxy group, butoxy group, iso-butyloxy group, sec-butyloxy group, tert-butyloxy group, etc. can be exemplified.

A cation which is included in the solid polymer electrolyte (A) having a unit shown in the formula (1), is a hydrogen ion, but it may actually exist in the form of oxonium ion which is produced by combining the hydrogen ion with water. Generally, it is difficult to distinguish them. In the present specification, both of them are described as a hydrogen ion. The hydrogen ion is not connected with the solid polymer electrolyte (A) through chemical bonding, so that the hydrogen ion is movable within the solid polymer electrolyte.

An anion $Y^-$, which is a counter anion to the hydrogen ion that is a movable ion, is connected with a polymer main chain of the solid polymer electrolyte (A). As such anion $Y^-$, carboxylic acid anion, sulfonic acid anion, phosphonate anion, etc. can be exemplified. In terms of an increase in the degree of dissociation of the ion, a conjugated anion derived from much stronger acid is more preferable. Sulfonate anion or phosphonate anion is preferable. Taking into account the easiness of introduction of anion, sulfonate anion is preferably used.

Accordingly, a polymer block (a-1) which is included in the solid polymer electrolyte (A) is a polymer block made from styrene, a-methylstyrene, o-methylstyrene, m-methylstyrene, 1,1-diphenyl ethylene, etc., and at least at a part of these aromatic rings in the polymer block, a sulfonic acid group is preferably introduced. Among them, in terms of productivity, availability, easiness of introduction of the sulfonic acid group etc., a block copolymer, which is used as a precursor and is comprised of aromatic rings such as polystyrene and/or poly α-methylstyrene, is preferably used. And at least at a part of the aromatic rings, the sulfonic acid group is preferably introduced. Hereinafter, the polymer block (a-1) may be referred to as a sulfonated polystyrene type block.

The amount of sulfonic acid group introduced into the polymer block is not specifically limited, but in light of handling ability, solubility, ionic conductivity and accordingly the performance of the obtained solid polymer electrolyte (A), the amount is in the range of 10-100% by mole per aromatic ring, preferably 25-80% by mole, more preferably 40-70% by mole. This index may be referred to as a sulfonation rate. Here, sulfonation rate of 50% by mole indicates that 50 sulfonic groups are introduced into 100 aromatic rings. When the sulfonation rate is not higher than this rate, the amount of ionic group could be said to be insufficient, and the performance of the obtained polymer transducer is undesirably lowered.

A polymer block (a-2) which is included within the solid polymer electrolyte (A) is required to have rubber elasticity at 25° C., in other words, its glass-transition temperature (Tg) should not be higher than 25° C., preferably 0° C. (Tg is not higher than 0° C.), more preferably −30° C. (Tg is not higher than −30° C.). Under such conditions, the coating film obtained from the paste via coating/drying steps shows flexible. Accordingly, a flexible polymer transducer can be obtained. As long as these limitations are met, there is no other limitation on the polymer block (a-2). However, as a preferable example of the polymer block (a-2), poly conjugated diens such as polybutadiene, polyisoprene, poly(butadiene-r-isoprene), poly(styrene-r-butadiene), poly(styrene-r-isoprene), poly(acrylonitrile-r-butadiene), etc.; hydrogenated poly conjugated diens obtained by hydrogenation of a part or all of carbon-carbon double bonds which exist in the above mentioned polyconjugated diens; poly(meth)acrylates such as poly n-butylacrylate, poly 2-ethylhexylacrylate, poly 2-ethylhexylmethacrylate, etc.; polyisobutylene; polysiloxanes; etc. can be exemplified. In view of properties as a rubber and suppression of side reactions at the time of introduction of the sulfonic group into the polymer block (a-1), a rubber having a hydrogenated carbon-carbon double bond such as a hydrogenated polybutadiene, hydrogenated polyisoprene, hydrogenated-(butadiene-r-isoprene) or polyisobutylene is preferably used. A hydrogenation rate of hydrogenated polybutadiene, hydrogenated polyisoprene and hydrogenated (butadiene-r-isoprene) each is preferably more than 90% by mole per carbon-carbon double bond, more preferably more than 95% by mole, and still more preferably more than 98% by mole.

There is no specific limitation on a block sequence, but as a block sequence of the solid polymer electrolyte (A) or a block copolymer, any one of a linear-type block copolymer such as a di-block copolymer with a structure of (a-1)-(a-2), a tri-block copolymer with a structure of (a-1)-(a-2)-(a-1) or (a-2)-(a-1)-(a-2), a tetra-block copolymer with a structure of (a-1)-(a-2)-(a-1)-(a-2), or a penta-block copolymer with a structure of (a-1)-(a-2)-(a-1)-(a-2)-(a-1) or (a-2)-(a-1)-(a-2)-(a-1)-(a-2); or a star-type block copolymer with a structure of $[(a-1)-(a-2)]_n$-X, $[(a-2)-(a-1)]_n$-X (n is 2 or more, X is a coupling agent residue) is preferably used. The (a-1)-(a-2)-(a-1) type tri-block copolymer is more preferably used.

It is difficult to measure the number average molecular weight of the solid polymer electrolyte (A) if once it is sulfonated. Accordingly, the number average molecular weight may be represented by a number average molecular weight measured before the introduction of the sulfonic acid group. Under such conditions, the number average molecular weight is preferably in the range of 3,000-300,000, more preferably 10,000-200,000. When the number average molecular weight is lower than that, mechanical strength of the solid polymer electrolyte becomes poor, being undesirable. On the other hand, when the molecular weight is higher than that, solubility in a solvent becomes poor, being undesirable for forming pastes, too.

As for a total mass ratio of the polymer block (a-1) to the polymer block (a-2) is preferably in the range of 10:90-90:10. When the ratio is outside this range, mechanical strength may be substantially lowered or flexibility may be lowered, being undesirable.

The block copolymer may have another polymer block other than the polymer block (a-1) and the polymer block (a-2). Such another polymer block may be one or more. When two or more different polymer blocks are used as another polymer block, the polymer block may have the same or different chemical structure. As an example of the polymer which constitutes such polymer block, polyolefines such as polyethylene, polypropylene, polybutene-1, poly 4-methyl-1-pentene, etc.; polystyrenes having a substituent at p-position such as poly p-methylstyrene, poly p-ethylstyrene, poly p-adamantylstyrene, poly p-t-butylstyrene, etc.; poly (meth) acrylates such as polymethylmethacrylate, polyethylmethacrylate, polymethylacrylate, polyethylacrylate, polybutylacrylate, poly 2-hydroxyethylacrylate, etc.; halogen-containing polymers such as polyvinylchloride, polytetrafluoroethylene, polyhexafluoropropylene, polyvinylidenefluoride, etc.; polyesters such as polyethylene terephthalate, polyethylenenaphthalate, polybutylene terephthalate, polyactic acid, polyglycolic acid, poly ε-caprolactone, etc.; polyamides such as polyamide-6, polyamide-6, 12, polyamide-6T, polyamide-9T, etc.; polyurethanes; polysiloxanes; etc., can be exemplified.

It could be possible to make the another polymer block mentioned above perform a specified function. For example, when the another polymer block is expected to have a specified function to increase shape stability, it is preferable to use a crystalline polymer such as polyethylene, polypropylene, poly 4-methyl-1-pentene, polyvinylchloride, polytetrafluoroethylene, polyvinylidenefluoride, polyethylenenaphthalate, polyethyleneterephthalate, polybutyleneterephthalate, polyacticacid, polyamide-6, polyamide-6,12, polyamide-6T, polyamide-9T, etc, or a polymer having a high glass transition temperature such as poly p-methylstyrene, poly p-adamantylstyrene, poly p-t-butylstyrene, etc. Here, due to that another polymer block is expected to have another function other than the function of the polymer block (a-1), the polymer block should preferably and substantially have no ionic group.

As a more specific example of the block copolymer, a tri-block copolymer having a block sequence of (a-1)-(a-2)-(a-1) can be exemplified, which comprises: the polymer block (a-1) comprising styrene and/or α-methylstyrene, to which a sulfonic acid group directly connects to p-position (4 position) of the benzene ring of the styrene and/or α-methylstyrene; and the polymer block (a-2) comprising 1,3-butadiene unit and/or isoprene unit, a part or all of a carbon-carbon double bond of which is hydrogenated.

The organic solvent (B) which is contained in the paste of the present invention is required to have a boiling point of 150° C. or higher at atmospheric pressure. When the boiling point is lower than that, the paste tends to dry, so that workability at the time of coating is lowered.

As such organic solvent (B), for example, saturated or unsaturated aliphatic hydrocarbons, such as octane, nonane, decane, undecane, decene, undecene, α-terpinene, β-terpinene, etc.; aromatic hydrocarbons such as cumene, o-cymene, m-cymene, p-cymene, o-diethylbenzene, m-diethylbenzene, p-diethylbenzene, o-diisopropylbenzene, m-diisopropylbenzene, p-diisopropylbenzene, and a mixture of isomers thereof; alcohols such as 1-hexanol, 1-octanol, 2-octanol, 3-octanol, terpineol, benzyl alcohol, ethylene glycol, ethyleneglycol monomethylether, ethyleneglycol monoethylether, ethyleneglycol monobutylether, terpineol, cyclohexanol, etc.; esters such as ethyleneglycol monomethylether acetate, ethyleneglycol monobutylether acetate, diethyleneglycol monomethylether acetate, diethyleneglycol monobutylether acetate, etc.; ketones such as isophorone, cyclohexanone, 2-octanone, 3-octanone, etc.; amides such as N-methylpyrrolidone, formamide, dimethylformamide, etc., can be exemplified. These solvents can be used alone or as a combination of two or more. A combination of two solvents is preferably used. This is because the solid polymer electrolyte (A), which is contained in the paste, has two blocks (a-1) and (a-2). (a-1) is a sulfonated polystyrene series having a high polarity, but (a-2) has a low polarity. Accordingly it is difficult to dissolve the block copolymer using a single solvent.

When the organic solvent (B) has too high boiling point, a drying step after a paste coating step requires a long period of time, or the solvent undesirably tends to remain in the coating film. Accordingly, the boiling point of the solvent should be preferably lower than 300° C., more preferably lower than 250° C.

The non-dissociable particles (C) in the paste of the present invention is required to be insoluble in the organic solvent (B) and to have an average major axis of 1-100 μm and have an average aspect ratio (a ratio of the major axis to the minor axis of the particles) of 5 or less, preferably 3 or less, more preferably in the range of 1-1.5. The measurement of average major axis and average aspect ratio can be carried out using an electron microscopic observation in which 100 particles are selected randomly and each major axis and aspect ratio of the particles are measured and then averaged.

Here, "non-dissociable" means "not dissociate into ions". Salts such as sodium chloride, sodium bicarbonate, calcium carbonate, etc. minerals such as talc, clay, etc. are substances having dissociable ions and accordingly are not classified into non-dissociable substances.

When the major axis of the non-dissociable particles (C) is 100 μm or over, there tends to occur sedimentation of the particles in the paste and clogging of the screen at the time of the coating process. Accordingly, printability may be damaged, being undesirable. On the other hand, when the major axis of the non-dissociable particles (C) is less than 1 μm, viscosity of the paste excessively increases with the increase in the amount of the non-dissociable particles (C), and further the electronic conductivity tends to be undesirably lowered when the electrode is formed from the paste.

When the aspect ratio is 5 or more, flexibility of the coating films or polymer transducers tends to be damaged.

As the non-dissociable particles (C) in the paste, for example, non-dissociable polymer particles and inorganic particles can be exemplified. The non-dissociable polymer particles are preferably used. Particles from a crystalline polymer and from a cross-linked polymer are more preferably used. Particles from a cross-linked polymer having a three-dimensionally cross-linked structure are still more preferably used. As specific non-dissociable particles (C), for example, particles from crystalline polymers such as polyethylene, polypropylene, polyamide, polyethylene terephthalate; particles from cross-linked polymers such as cross-linked polyethylene, cross-linked polypropylene, cross-linked polystyrene, cross-linked polyvinylchloride, cross-linked polymethacrylic acid ester, cross-linked polyacylic acid ester, cross-linked polyacrylonitrile, cross-linked AS resin (acrylonitrile-styrene copolymer) particles, cross-linked ABS resin (acrylonitrile-butadiene-styrene copolymers) particles, cross-linked poly(styrene-methacrylic acid ester) copolymer particles, cross-linked poly(styrene-acrylic acid ester) copolymer particles, cross-linked polytetrafluoroethylene particles, cross-linked polyvinylidenefluoride particles, cross-linked polyvinylidenechloride, cross-linked polyvinylacetate resin, cross-linked polyvinylalcohol particles, cross-linked poly(ethylene-vinyl acetate) copolymer particles, cross-linked poly(ethylene-vinylalcohol) copolymer particles, cross-linked polyethyleneglycol particles, cross-linked polypropyleneglycol particles, cross-linked polyethyleneterephthalate particles, cross-linked polybutyleneterephthalate particles, cross-linked polyamide particles, cross-linked polycarbonate particles, etc.; inorganic particles such as diamond powder, glass beads, alumina beads, zirconia beads, etc., can be exemplified.

Among them, cross-linked polystyrene particles, cross-linked polymethylmethacrylate particles, glass beads are preferably used because particles having an appropriate particle size are easily available. Cross-linked polystyrene particles, cross-linked polymethylmethacrylate particles are more preferably used, because the obtained pastes are highly stable.

The paste of the present invention comprises the solid polymer electrolyte (A), the organic solvent (B), and the non-dissociable particles (C). The coating film which is obtained from this paste for forming electrolyte film through coating/drying steps, comprises the solid polymer electrolyte (A) and the non-dissociable particles (C). After the coating step, the organic solvent (B) in the paste vaporizes during a drying step.

The composition ratio of the solid polymer electrolyte to the non-dissociable particles (C) greatly influences on physical properties of the coating film. For example, mass ratio of (A) to (C) falls in the range of 10:90-90:10. In terms of the flexibility and ionic conductivity of the film, the mass ratio of (A) to (C) is preferably in the range of 50:50-80:20. When the solid polymer electrolyte (A) is more than this amount, coatability of the paste may be lowered, on the other hand when the non-dissociable particles (C) is used more than this amount, ionic conductive and flexibility of the film may be lost.

A solid content concentration (%), which is defined by the following equation (2) described below, has an influence on the print characteristics or handling ability of the paste, and further on the suitable printing method.

$$\{(A)+(C)\}/\{(A)+(B)+(C)\} \times 100\% \tag{2}$$

In the equation (2), (A) is a mass of solid polymer electrolyte, (B) is a mass of organic solvent, and (C) is a mass of non-dissociable particles.

As mentioned above, an appropriate solid content concentration is determined depending on a printing system to be adopted. In light of the shape of the electrolyte film to be used for polymer transducer of the present invention, an appropriate solid content concentration for screen printing method is preferably 10% or more, more preferably 20% or more, still more preferably 30% or more. When the solid content concentration is lower than that, a defect tends to occur due to dripping of the paste because the viscosity of the paste is too low. When the solid content concentration is more than 70%, the viscosity of the paste becomes too high. Accordingly a defect such as a scrape tends to occur.

A paste suitable for forming the electrolyte film is obtained by mixing the solid polymer electrolyte (A), the organic solvent (B) and the non-dissociable particles (C) using an appropriate method. The solid polymer electrolyte (A) may be dissolved or dispersed, but from the view point of obtaining a homogeneous coating film, the solid polymer electrolyte is preferably dissolved in the organic solvent.

There is no specific limitation on the mixing method. For example, the solid polymer electrolyte (A) is previously dissolved in the organic solvent (B) to obtain a liquid (vehicle). Then the non-dissociable particles (C) is added into the vehicle and then mixed using a kneader or disperser such as an agitator (mixing blade), beads mill, ball mill, roll mill, etc.

The paste suitable for forming the electrolyte film can be coated using various methods. As the coating method, spraying, dipping, bar coating, doctor blading, relief printing, intaglio printing, lithographic printing, screen printing, ink jet etc. can be exemplified. Among them, screen printing is preferably adopted in terms of film's shape and workability.

Coating and drying of the paste which is suitable for forming the electrolyte film is carried out to obtain the electrolyte film. There is no specific limitation on the drying conditions, but the drying is carried out at a temperature of 50-150° C., for a time range of one second to one day. The drying conditions are determined dependent on the kind of the organic solvent (B) and the composition ratio of the solid polymer electrolyte (A) to the non-dissociable particles (C).

The paste suitable for forming the electrode film comprises at least 3 components, the solid polymer electrolyte (A), the organic solvent (B) and the non-dissociable (C). The coating film obtained by coating and drying the paste for electrode film comprises at least two components, the solid polymer electrolyte (A) and the non-dissociable particles (C). The organic solvent (B) included in the paste vaporizes during a drying step after a coating step. It is desirable that the organic solvent does not remain in the coating film.

The paste of the present invention, which is suitable for forming the electrode film, is prepared by further adding the conductive fine particles (D) to the paste which is suitable for forming the electrolyte film. The solid polymer electrolyte (A), the organic solvent (B) and the non-dissociable particles (C), all of which are components for the paste suitable for forming the electrolyte film, can be used as the same components for forming the electrode film.

An average particle diameter of the conductive fine particles (D) is preferably 1/50 times or less that of the non-dissociable particles (C). When this requirement is met, it is easy for the conductive fine particles (D) to easily form a network due to what is called an excluded volume effect, so that the electrode excellent in electro conductivity can be easily obtained.

As the conductive fine particles (D) which is contained in the paste suitable to form the electrode film, for example, fine particles of metal such as gold, silver, copper, platinum, aluminum, nickel, etc.; fine particles of metallic compound such as ruthenium oxide ($RuO_2$), titanium oxide ($TiO_2$), tin oxide ($SnO_2$), iridium dioxide ($Ir_2O_3$), tantalum oxide ($Ta_2O_5$), indium-tin oxide composite (ITO), zinc sulfide (ZnS), etc.; fine particles of conductive carbon such as carbon black, carbon nanotube such as single-walled carbon nanotube (SWCNT), double-walled carbon nanotube (DWCNT), multi-walled carbon nanotube (MWCNT), vapor-grown carbon fiber (VGCF), etc.; powder of conductive polymer such as polyacetylene, polypyrrole, polythiophene, derivatives of these polymers, etc. can be exemplified. These substances can be used alone or in combination of two or more. Among them, conductive carbon fine particles are preferably used in terms of the industrial economy, electrochemical stability as a polymer transducer, etc. Further, carbon black having a large specific surface area is more preferably used in view of the performance of the polymer transducer. As an example of such carbon black, Ketjenblack (Trade name, produced by Lion Corporation) can be exemplified. The average particle diameter of the conductive fine particles (D) is measured using an electron microscopic observation in which 100 particles are randomly selected and each particle's diameter is measured. Then the average particle diameter is calculated.

A paste suitable to form the electrode film comprises at least 4 components; the solid polymer electrolyte (A), the organic solvent (B), the non-dissociable particles (C) and the conductive fine particles (D). By the way, a coating film obtained by coating and drying this paste for forming the electrode film comprises at least 3 components; the solid polymer electrolyte (A), the non-dissociable particles (C), and the conductive fine particles (D). The organic solvent (B) which is contained in the paste vaporizes during a drying step after a coating step. It is desirable that no organic solvent remains in the coating film.

A composition ratio of the solid polymer electrolyte (A), the non-dissociable particles (C) and the conductive fine particles (D) substantially influences on a physical properties of the coating film obtained by drying and solidifying the paste.

The composition ratio of the solid polymer electrolyte (A) to the conductive fine particles (D) greatly influences on the electron conductivity of the coating film. For example, the mass ratio of (A) to (B) is in the range of 99:1 to 1:99. In view of the flexibility and electron conductivity of the obtained coating film, (A): (D) is preferably in the range of 95:5 to 25:75. When the amount of the solid polymer electrolyte (A) is more than that, electron conductivity is lowered. When the amount of the conductive fine particles (D) is more than that, flexibility tends to be lowered.

The amount of the non-dissociable particles (C) is preferably 5 parts by mass or more, more preferably 10 parts by mass or more, with respect to 100 parts by mass in total of the solid polymer electrolyte (A) and the conductive fine particles (D). When the amount of the non-dissociable particles (C) is less than that, the effect of the present invention is not fully demonstrated, and when the amount is more than 80 parts by mass, flexibility of the coating film is undesirably lowered.

A solid content concentration (%) in the paste, which is defined by the following equation (3) shown below, have an influence on the print characteristics or handling ability of the paste, and further on the suitable printing method.

$$[\{(A)+(C)+(D)\}/\{(A)+(B)+(C)+(D)\}] \times 100\ (\%) \tag{3}$$

In equation (3), (A) is a mass of the solid polymer electrolyte, (B) is a mass of the organic solvent, (C) is a mass of the non-dissociable particles, and (D) is a mass of the conductive fine particles.

As mentioned above, an appropriate solid content concentration depends on a printing system to be adopted. A screen printing is preferably adopted in terms of the shape of the electrolyte film to be used for polymer transducer of the present invention, an appropriate solid content concentration is preferably 10% by mass or more, more preferably 20% by mass or more, still more preferably 30% by mass or more. When the solid content concentration is lower than that, a defect tends to occur due to dripping of the paste because the viscosity of the paste is too low. When the solid content concentration is more than 70% by mass, the viscosity of the paste becomes too high. Accordingly a defect such as a scrape tends to occur.

A paste suitable for formation of the electrode film is obtained by mixing the solid polymer electrolyte (A), the organic solvent (B), the non-dissociable particles (C), and the conductive fine particles (D) using an appropriate method. The solid polymer electrolyte (A) may be dissolved or dispersed, but from the view point of obtaining a homogeneous coating film, the solid polymer electrolyte is preferably dissolved in the organic solvent.

There is no specific limitation on the mixing method. For example, the solid polymer electrolyte (A) is previously dissolved in the organic solvent (B) to obtain a liquid (vehicle). Then the non-dissociable particles (C) and the conductive fine particles (D) are added into the vehicle and then mixing is carried out using a kneader or disperser such as an agitator (mixing blade), beads mill, ball mill, roll mill, etc.

The paste suitable for forming the electrolyte film can be coated using various methods. As the coating method, spraying, dipping, bar coating, doctor blading, relief printing, intaglio printing, lithographic printing, screen printing, ink jet etc. can be exemplified. Among them, screen printing is preferably adopted in terms of film's shape and workability.

Coating and drying of the paste which is suitable for forming the electrolyte film is carried out to obtain the electrolyte film. There is no specific limitation on the drying conditions, but the drying is carried out at a temperature of 50-150° C., for a time period ranging from one second to one day. The drying conditions are determined dependent on the kind of the organic solvent (B) and the composition ratio of the solid polymer electrolyte (A) to the non-dissociable particles (C).

The polymer transducer of the present invention, which comprises an electrolyte film and/or an electrode film that is prepared from a coating film obtained by drying and solidifying a paste, will now be explained precisely with referring to FIG. 1. The polymer transducer 1 has a structure that has an electrolyte layer 2 to which a pair of electrode layers 3a, 3b which are independently isolated from each other is attached. In other words, the electrode layer 3a/the electrolyte layer 2/the electrode layer 3b are laminated in this order in the thickness direction. Here, the laminated electrodes 3a, 3b are each independently laminated and electrically insulated from each other. When polymer transducer 1 is used as a bend sensor for measuring the amount of bending, a potential difference generated, when bended, between the electrodes 3a, 3b, is measured and used as a signal. On the other hand, when it is used as an actuator, a voltage difference is given from outside to the electrodes 3a, 3b to drive the actuator.

Figure 2:
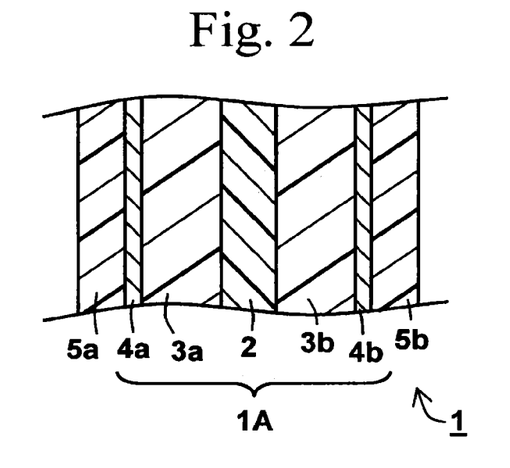
FIG. 2 is a cross-sectional view showing another polymer transducer of the present invention, which has other members.

FIG. 2 shows another polymer transducer 1 having other members. This polymer transducer 1 comprises: a laminated structure of the electrode layer 3a/the electrolyte layer 2/the electrode layer 3b; and current collectors 4a, 4b each of which is independently attached to the surface of the electrode layers 3a, 3b respectively to reduce a resistance in a longitudinal direction of 3a, 3b. Further film substrates 5a, 5b are attached on the outer surface of the current collectors 4a, 4b respectively as a protective layer. Here, the laminated structure of the current collector 4a/the electrode layer 3a/the electrolyte layer 2/the electrode layer 3b/the current collector 4b is referred as sensor unit 1. The current collectors 4a, 4b can be disposed on the outside surface of at least one of the electrode layers 3a, 3b, in other words, on the outer side surface of the electrode layers 3a, 3b with respect to the solid polymer electrolyte 2.

In the electrolyte layer 2 and the electrodes 3a, 3b of the polymer transducer 1, only the electrolyte layer 2 may be produced from the electrolyte film formed from the paste suitable for forming electrolyte film, or only the electrode layers 3a, 3b may be produced from the electrode film formed from the paste suitable for forming electrode film, or alternatively, both electrolyte layer 2 and electrode layers 3a, 3b may be formed from the paste of the present invention.

As the current collectors 4a, 4b, for example, foil or thin film of metal such as gold, silver, copper, platinum, aluminum, etc.; a molded product comprising a binder resin and a powder of metal such as gold, silver, nickel, etc., carbon fine powder such as carbon powder, carbon nanotube, carbon fiber, etc.; metal thin film formed on woven fabric, paper, non-woven fabric, polymer film, etc. using sputtering plating, etc. can be exemplified. Among them, in view of flexibility, a film-like molded product comprising metal powder and binder resin, or a metal film formed on a fabric or polymer film etc. are preferably used.

As the film substrate 5a and 5b, a versatile polymer film such as, for example, polyethylene terephthalate film, polyethylene naphthalate film, polyolefin film, polyurethane film, polyvinylchloride film, elastomer film, etc. can be arbitrarily used depending on the intended use. By the way, this film substrate may be removed when the polymer transducer is used, or alternatively this film substrate can be used as it is in one body. When the film is used as it is, the film substrate acts as a protective layer.

The shape of such polymer transducer 1 is not specifically limited. For example, various shapes can be exemplified such as membrane-like film-like, sheet-like, plate-like, fiber-like, cylinder-like, pillar-like, sphere-like shape etc.

Figure 1:
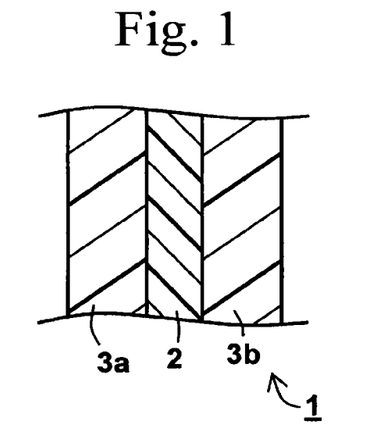
FIG. 1 is a cross-sectional view showing a polymer transducer of the present invention.

Membrane-like, film-like, sheet-like or plate-like polymer transducer 1, as shown in FIGS. 1 and 2, can be produced, for example, as follows.

Process 1: on both surfaces of a membrane-like shaped electrolyte membrane 2, the layers 3a, 3b, which is produced by coating and drying the paste, are bonded in such a manner to ensure electrical insulation between them (see FIG. 1). If necessary, the current collectors 4a, 4b are formed using a coating step, etc. (FIG. 2).

Process 2: on both surfaces of membrane-like shaped electrolyte layer, the paste is coated and dried to form the electrode membranes 3a, 3b both of which are electrically insulated (FIG. 1). If necessary, the current collectors 4a, 4b are formed using coating technique, etc. (FIG. 2).

Process 3: if necessary, on the film substrate 5a, the current collector 4a is formed; then on the current collector 4a, paste for forming the electrode film is coated and dried to form electrode layer 3a on which the paste for forming electrolyte film is coated and dried to form the electrolyte layer 2. Then paste for forming an electrode film is coated and dried to form the electrode layer 3b. If necessary, the current collector 4b is formed. Further if necessary, a film substrate is bonded as a cover film (FIG. 2).

Process 4: if necessary, on the film substrates 5a, 5b, the current collectors 4a, 4b are formed. Then paste for forming electrode film is coated and dried to form the electrode layers 3a, 3b. Next, a paste for forming electrolyte film is coated on the electrode layers 3a, 3b and dried to form two laminate structures of the electrode layer 3a—the electrolyte layer 2, and the electrode layer 3b—the electrolyte layer 2. Then the two electrolyte layers of the two film-like precursors are placed in a face-to-face manner, then heat-pressed to bond each other to obtain a laminate structure (FIG. 2).

Thicknesses of the electrode layers 3a, 3b, the electrolyte layer 2, the current collectors 4a, 4b, and the film substrates 5a, 5b, are not specifically limited, and are arbitrarily adjusted depending on the use of the polymer transducers, but the preferable thicknesses of the electrode layers 3a, 3b is in the range of 1 µm to 10 mm, more preferably 5 µm-1 mm, still more preferably 10-500 µm. The thickness of the electrolyte layer 2 is preferably in the range of 1 µm-10 mm, more preferably 5 µm-1 mm, still more preferably 10-500 µm. When the current collectors 4a, 4b are disposed as shown in FIG. 2, the thicknesses of them are preferably in the range of 1 nm-1 mm, more preferably 5 nm-100 µm, still more preferably 10 nm-50 µm. The thicknesses of the film substrates 5a, 5b, which are shown in FIG. 2 and regardless of whether they are used as it is for the protective layer or not and from the viewpoint of handling easiness and strength, is preferably 1 µm-10 mm, more preferably 10 µm-1 mm, still more preferably 30 µm-500 µm.

The polymer transducer 1 of the present invention can be operable in air, water, vacuum and organic solvent. Further it may be sealed depending on the usage environment. Various resins can be used as the sealing material.

When mechanical energy such as displacement, pressure, etc. is applied from outside to polymer transducer 1 of the present invention, potential difference (voltage) as electric energy is generated between the electrodes that are electrically isolated from each other. Accordingly, the polymer transducer of the present invention can be used as a deformation sensor or sensor element to detect a variation, displacement or pressure.

EXAMPLE

Hereinafter the embodiment of the present invention will be precisely explained, but the scope of the present invention is not limited to these embodiments.

Preparation of the paste of the present invention is shown in Examples 1-8. Manufacture of the polymer transducers having a coating film as an electrolyte film or an electrode film which was obtained by coating and drying the paste, is shown in Examples 9-13.

Material used in Examples and Comparative Examples are shown below.

(1) hydrogenated poly-α-methylstyrene-b-poly (1,3-butadiene)-b-poly α-methylstyrene (mSEBmS):

Poly-α-methylstyrene-b-poly (1,3-butadiene)-b-poly α-methylstyrene type tri-block copolymer was synthesized according to the similar method described in International Patent Publication 02/40611. The number average molecular weight of the obtained tri-block copolymer was 76,000 (measured in terms of polystyrene, using a gel permeation chromatography (GPC)). The amount of 1,4-linkage derived from 1,3-butadiene was 55% and the content of α-methylstyrene unit was 30% by mass. Cyclohexane solution of the synthesized tri-block copolymer was prepared. After sufficient nitrogen gas replacement, the solution was charged into a pressure-resistant container. Hydrogenation reaction was carried out using Ni/Al series Ziegler type catalyst for hydrogenation under hydrogen environment at 80° C. for 5 hours to obtain mSEBmS. The hydrogenation rate of the obtained mSEBmS measured by $^1$H-NMR was 99.6 mol %.

(2) acetic anhydride: produced by Wako Junyaku Kogyo Kabushiki Kaisha, used as it was (3) concentrated sulfuric acid: produced by Wako Junyaku Kogyo Kabushiki Kaisha, used as it was (4) dichloromethane: produced by Kishida Kagaku Kabushiki Kaisha, it was contacted with molecular sieve (4A) before use (5) diisopropyl benzene: produced by Mitsui Kagaku Kabushiki Kaisha, used as it was (6) 1-hexanol: produced by Wako Junyaku Kogyo Kabushiki Kaisha, used as it was (7) conductive carbon black: Ketjenblack EC600JD (Trade name, produced by Lion Kabushiki Kaisha), used after vacuum drying at 150° C. for 12 hours, primary particle diameter was 34 nm (8) glass beads: EGB731 (Trade Name, produced by Potters Ballotini Kabushiki Kaisha), average particle diameter: 20 μm, aspect ratio: 1, true density: 2.6 g/cm$^3$ (9) cross-linked polymethylmethacrylate particles (1): "MX2000" (Trade name, produced by Soken Kagaku Kabushiki Kaisha), average particle diameter: 20 μm, aspect ratio: 1, true density: 1.2 g/cm$^3$ (10) cross-linked polymethylmethacrylate particles (2): MX 150 (Trade name, produced by Soken Kagaku Kabushiki Kaisha), average particle diameter: 1.5 μm, aspect ratio: 1, true density: 1.2 g/cm$^3$ (11) cross-linked polystyrene particles:
SX130H (Trade name, produced by Soken Kagaku Kabushiki Kaisha), average particle diameter: 1.3 μm, aspect ratio: 1, true density: 1.1 g/cm$^3$ (12) calcium carbonate (dissociable): Snowlight (Trade name, produced by Maruo Karushium Kabushiki Kaisha), average diameter: 1.7-2.2 μm (13) talc (dissociable): Micron White (Trade name, produced by Hayashi Kasei Kabushiki Kaisha), average diameter: 2.8 μm (14) glass fiber: chopped strand 03-JA FT2A (Trade name, produced by Owens Corning Japan Kabushiki Kaisha), average fiber length (major axis): 3 mm, average fiber diameter (minor axis): 1 μm Other solvent and reagents were obtained from the market and purified before use, if necessary, in the usual manner.

Preparatory Example 1

355 g of mSEBmS was charged into a glass-made reaction container with stirrer and vacuum-dried for 1 hour. After the reaction system was replaced with nitrogen gas, and 3L of methylene chloride was added and stirred at 35° C. for two hours to dissolve mSEBmS. After the dissolution, sulfonating agent (acetyl sulfate) obtained by reacting acetic anhydride (34.7 mL) with concentric sulfuric acid (77.5 mL) in methylene chloride (155 mL) at 0° C., is added dropwise over a period of 5 minutes. The mixture was stirred at 35° C. for 7 hours and then the reacted mixture was poured into a 10 L of distilled water with stirring. Thus sulfonated mSEBmS was coagulated and precipitated. The precipitated solid content was washed with distilled water at 90° C. for 30 minutes, and further filtrated. This washing and filtration step was repeated until there was no change in pH of wash water, and at last the filtered polymer was vacuum dried to obtain sulfonated mSEBmS. The sulfonation rate of the benzene ring of α-methylstyrene unit in the obtained sulfonated mSEBmS was 49.8 mole %, and proton exchange capacity was 1.08 mmol/g when measured by $^1$H-NMR (Nuclear Magnetic Resonance) spectrum measurement.

Example 1

26 g of sulfonated mSEBmS (solid polymer electrolyte (A)) obtained in Preparatory Example 1 was stirred and dissolved into a mixed solvent of 59 g of diisopropyl benzene and 15 g of 1-hexanol (organic solvent (B)). Then into this solution, 12 g of glass beads (non-dissociable particles (C)) was added and thoroughly mixed to prepare a paste (I-1).

Example 2

In Example 1, a similar procedure was carried out to prepare a thoroughly mixed paste (1-2), except that 5.5 g of cross-linked polymethylmethacrylate (1) was used instead of 12 g of the glass beads.

Example 3

In Example 1, a similar procedure was carried out to prepare a thoroughly mixed paste (1-3), except that 5.5 g of cross-linked polymethylmethacrylate (2) was used instead of 12 g of the glass beads.

Example 4

In Example 1, a similar procedure was carried out to prepare a thoroughly mixed paste (1-4) except that 5 g of cross-linked polystyrene was used instead of 12 g of the glass beads.

Comparative Example 1

In Example 1, a similar procedure was carried out to prepare a paste (Comp. I-1), except that the glass beads were not used.

Comparative Example 2

In Example 1, a similar procedure was carried out to prepare a thoroughly mixed paste (Comp. I-2) except that 12 g of calcium carbonate was used instead of the glass beads

Comparative Example 3

In Example 1, a similar procedure was carried out to prepare a thoroughly mixed paste (Comp. I-3) except that 12 g of talc was used instead of the glass beads.

Comparative Example 4

In Example 1, a similar procedure was carried out to prepare a thoroughly mixed paste (Comp. I-4) except that 12 g of glass fiber was used instead of the glass beads.

Example 5

23.6 g of sulfonated mSEBmS (solid polymer electrolyte (A)) obtained in Preparatory Example 1 was stirred and dissolved into a mixed solvent of 22.2 g of diisopropyl benzene and 51.8 g of 1-hexanol(organic solvent (B)). Then into this solution, 11.6 g of glass beads (non-dissociable particles (C)) and 5.26 g of Ketjenblack (conductive fine particles (D)) was added, and then dispersed to prepare a paste (II-1) using an emulsifying machine for precise dispersion (Clearmix CLM-0.8S, Trade name, produced by M Technique Corporation) under a rotor rotation speed of 4,500 rpm for 30 minutes.

Example 6

In Example 5, a similar procedure was carried out to prepare a paste (II-2) except that 5.35 g of cross-linked polymethylmethacrylate (1) was used instead of 11.6 g of the glass beads.

Example 7

In Example 5, a similar procedure was carried out to prepare a paste (II-3) except that 5.35 g of cross-linked polymethylmethacrylate (2) was used instead of 11.6 g of the glass beads.

Example 8

In Example 5, a similar procedure was carried out to prepare a paste (II-4) except that 4.91 g of cross-linked polystyrene was used instead of 11.6 g of the glass beads

Comparative Example 5

24 g of sulfonated mSEBmS (solid polymer electrolyte (A)) obtained in Preparatory Example 1 was stirred and dissolved into a mixed solvent of 21.6 g of diisopropyl benzene and 50.4 g of 1-hexanol (organic solvent (B)). Then into this solution 4.59 g of Ketjenblack (a conductive fine particles (D)) was added, and then dispersed to prepare a paste (Comp. II-1) using the emulsifying machine for precise dispersion (Clearmix CLM-0.8S, Trade name, produced by M Technique Corporation) under a rotor speed of 4,500 rpm for 30 minutes

Comparative Example 6

In Example 5, a similar procedure was carried out to prepare a paste (Comp. II-2) except that 11.6 g of calcium carbonate was used instead of 11.6 g of the glass beads.

Comparative Example 7

In Example 5, a similar procedure was carried out to prepare a paste (Comp. II-3) except that 11.6 g of talc was used instead of 11.6 g of the glass beads.

Comparative Example 8

In Example 5, a similar procedure was carried out to prepare a paste (Comp. II-4) except that 12 g of glass fiber was used instead of 11.6 g of the glass beads.

(Evaluation of Paste and Coating Film)

Storage stability and printing characteristics of the paste obtained in Examples 1-8 and Comparative Examples 1-8 were evaluated.

(1) Evaluation of Storage Stability of Pastes

Pastes of (I-1) to (I-4), (Comp. I-1) to (Comp. I-4), (II-1) to (II-4) and (Comp. II-1) to (Comp. II-4) were each collected into each glass bottle. The bottle was sealed with a lid and stored quietly as it was at 25° C. for 10 days. After 10 days, the state of the paste was visually observed before and after stirring the paste with a stick. If there was no change in the state of the paste, it was rated as "excellent", if gelation was observed it was rated as "good" and if sedimentation was observed, rated as "poor".

(2) Evaluation of Printability of Paste

Each of the prepared pastes (I-1) to (I-4), (Comp. I-1) to (Comp. I-4), (II-1) to (II-4) and (Comp. II-1) to (Comp. II-4) was test-printed using a screen printing apparatus (LS-34TV, Trade name, produced by New Long Seimitsu Kogyo Kabushiki Kaisha). A screen used in this test printing was made from Tetoron (Trade name of polyester) and had 250 of mesh and 12 μm of emulsion thickness, the size of the pattern is 20 mm×20 mm. As a substrate, a stretched PP film (GLC-50, Trade mark, produced by Tohcello Kabushiki Kaisha, the film thickness: 50 m, one of the surfaces was corona treated) was used. Sensory evaluation was carried out to evaluate the printability of the paste by repeatedly printing each paste on the corona treated surface. Evaluation criterion was divided into four classes (A-D) as follows.

A: printable with no problem and no shape defects in coating film caused by dripping B: printable with no problem, but shape defect in coating film was observed C: occurrence of gelation in the paste, coating using screen printing method was impossible D: a mesh region of the screen was clogged, poor printability The number of repetitions of coating process necessary to reach a film thickness of 15 μm for each paste of Examples 1-4 and Comparative Examples 1-4, and the number of repetitions of coating process necessary to reach a film thickness of 100 μm for each paste of Examples 5-8 and Comparative Examples 5-8, were counted. The smaller the number of repetitions of the coating step to reach a desired film thickness is, the better the coating film can be formed industrially, economically and advantageously.

Each paste obtained in Examples 1-4 and Comparative Examples 1-4 was coated and dried on a film. Flexibility of the obtained film was evaluated.

(3) Evaluation of Flexibility of Coating Film

Pastes of (I-1) to (I-4) and (Comp. I-1)-(Comp. I-4) were each coated respectively on a mold-release treated surface of a mold-release treated polyethylene terephthalate (PET) film (Pyurex A31, Trade name, produced by Teijin Dupont Film Kabushiki Kaisha) using a block coater having a clearance of 750 μm, then dried on a hot plate at 100° C. to obtain a coating film. This coating film was cut into a size of 10 mm×30 mm, and a portion having a length of 15 mm in the longitudinal direction of a cut film was pinched and fixed. Changes in the films were observed when the remaining portion having a length of 15 mm was pushed and bended.

Storage stability and printing characteristics of the pastes obtained in Examples 1-4 and flexibility of the coating films are shown in Table 1. In the table, polymethylmethacrylate and polystyrene are each abbreviated as PMMA and PS respectively.

TABLE 1

|  | Ex. 1 | Ex. 2 | Ex. 3 | Ex. 4 |
|---|---|---|---|---|
| Paste | I-1 | I-2 | I-3 | I-4 |
| Non-dissociable particle (C) | Glass beads | Cross-linked PMMA (1) | Cross-linked PMMA (2) | Cross-Linked PS |
| Storage stability | Excellent | Excellent | Excellent | Excellent |
| Printing character | A | A | A | A |
| No. of coat repetitions | 6 | 7 | 8 | 7 |
| Change in film | Nothig in particular | Nothing in particular | Nothing in particular | Nothing in particular |

Storage stability and printing characteristics of the pastes obtained in Comparative Examples 1-4 and flexibility of the coating films are shown in Table 2.

TABLE 2

|  | Comp. Ex. 1 | Comp. Ex. 2 | Comp. Ex. 3 | Comp. Ex. 4 |
|---|---|---|---|---|
| Paste | Comp. I-1 | Comp. I-2 | Comp. I-3 | Comp. I-4 |
| Particle (C) | None | Calcium carbonate | Talc | Glass fiber |
| Storage stability | Excellent | Good | Good | Excellent |
| Printing character | B | C | C | D |
| No. of coat repetitions | 11 | Coating impossible | Coating impossible | 8 |
| Change in film | Nothing in particular | Non film prepared | Non film prepared | Cracking occurred |

As clearly seen from Table 1, the pastes of Examples 1-4 which met the requirements of the present invention had excellent storage stability and excellent printing characteristics. In addition, it was found that a desirable film thicknesses was obtained with a fewer number of repetition of the coating step, so that coating films could be produced industrially and economically.

On the other hand, as clearly seen from Table 2, the paste (Comp. I-1) of Comparative Example 1 which did not meet the requirements of the present invention was screen-printed without causing any problems, but there was shape defects caused by dripping due to its low viscosity. Further, the number of repetition of the coating step to obtain a desired film thickness was increased, resulting in decrease in the productivity. With regard to this paste (Comp. I-1), an increase in the solid content concentration or an increase in viscosity with increase in solid content was attempted. However, the solid polymer electrolyte (A) did not dissolve, so that the attempt did not lead to a solution. Likewise, with respect to the pastes (Comp. I-2) and (Comp. I-3) of Comparative Examples 2 and 3, which did not also meet the requirements of the present invention, showed significant gelation, and also showed poor storage stability and poor coatability due to this gelation. It is considered that this gelation was induced by cross-linking reaction between sulfonic acid group in the solid polymer electrolyte (A) and a metal component such as calcium or magnesium contained in the particles (C). Further, with regard to the paste (Comp. I-4) of Comparative Example 4 which did not meet the requirements of the present invention, there was no problem in storage stability, but the mesh region of the screen was clogged, accordingly it was found that it had poor printability.

From the above, the paste which meets the requirements of the present invention has an excellent storage stability and printability and can be used industrially and economically as a coating material. In addition, the coating films of Examples 1-4 had sufficient flexibility so that it was found that they can be used as electrolyte film for polymer transducers.

On the other hand, in Comparative Examples 2 and 3, coating of the paste itself was impossible, so that the coating film could not be produced, therefore evaluation of the film could not be performed. In comparative Example 4, the coating film was obtained, the flexibility of the film was reduced significantly. When the film is bent, the film was broken. From this, it is not suitable to use the coating film of Comparative Example 4 as an electrolyte film for forming polymer transducers.

Storage stability and printing characteristics of the pastes obtained in Examples 5-8 are shown in Table 3.

TABLE 3

|  | Ex. 5 | Ex. 6 | Ex. 7 | Ex. 8 |
|---|---|---|---|---|
| Paste | II-1 | II-2 | II-3 | II-4 |
| Non-dissociable particle (C) | Glass beads | Cross-linked PMMA (1) | Cross-linked PMMA (2) | Cross-linked PS |
| Storage stability | Excellent | Excellent | Excellent | Excellent |
| Printing character | A | A | A | A |
| No. of coat repetitions to predetermined thickness | 19 | 17 | 22 | 23 |

Storage stability and printing characteristics of the paste obtained in Comparative Examples 5-8 are shown in Table 4.

TABLE 4

|  | Comp. Ex. 5 | Comp. Ex. 6 | Comp. Ex. 7 | Comp. Ex. 8 |
|---|---|---|---|---|
| Paste | Comp. II-1 | Comp. II-2 | Comp. II-3 | Comp. II-4 |
| Particle (C) | None | Calcium carbonate | Talc | Glass fiber |
| Storage stability | Excellent | Good | Good | Excellent |
| Printing character | A | C | C | D |
| No. of coat repetitions | 40 | Coating impossible | Coating impossible | 34 |

As clearly seen from Table 3, the pastes of Examples 5-8 which met the requirements of the present invention had excellent storage stability and printing characteristics. It was found that a desired film thickness was obtained with fewer repetitions of the coating step. Accordingly, it was found that coating films can be formed industrially and economically.

On the other hand, as clearly seen from Table 4, the paste (Comp. II-1) of Comparative Example 5, which did not contain the particles (C) and did not meet the requirements of the present invention, had no problems in printing characteristics, but the number of repetitions of the coating step to obtain a desired film thickness increased, resulting in decline in productivity. With regard to this paste (Comp. II-1), an increase in the solid content concentration in the paste or a decrease in the number of repetitions of the coating step was attempted. However, the solid polymer electrolyte (A) was not dissolved, so that the attempt did not lead to a solution. Likewise, with respect to the pastes (Comp. II-2) and (Comp. II-3) of the Comparative Examples 6 and 7, which did not also meet the requirements of the present invention, showed significant gelation, poor storage stability and poor coatability due to the gelation. It is considered that this gelation was induced by cross-linking reaction between sulfonic acid group in the solid polymer electrolyte (A) and metal component such as calcium or magnesium which was included in the particles (C). Further, with regard to the paste (Comp. II-4) of Comparative Example 8 which did not meet the requirements of the present invention, there was no problem in storage stability, but the mesh region of the screen was clogged, accordingly, it was found that it had poor printability.

From the above, the pastes which meet the requirements of the present invention had an excellent storage stability and printability, and the printing step can be carried out industrially, economically and advantageously.

Example 9

The current collectors 4a, 4b were provided from a commercially available silver paste (Dotaito XA-954, Trade name, produced by Fujikura Kasei Kabushiki Kaisha) on polypropylene films 5a, 5b (unstretched polypropylene film, GLC 50, Trade name, film thickness: 50 μm, produced by Tohcello Kabushiki Kaisha). On current collectors 4a, 4b, the paste (Comp. II-1) which was prepared in Comparative Example 5 was coated using a screen printing apparatus LS-34TV, then dried at 80° C. This step was repeated until the thickness of the coating film reached 100 μm to form a laminated structure A having electrode films 3a, 3b. The paste (I-1) prepared in Example 1 was coated on each electrode film 3a, 3b of a laminated structure A using the screen printing apparatus LS-34TV, then dried at 80° C. This step was repeated until the thickness of the electrolyte film 2 reached 15 μm to form a laminated structure B.
The two surfaces of the two electrolyte films 2 were overlapped in a face-to-manner and pressed at 100° C. for 5 minutes, thus a polymer transducer 1 was obtained. Here, lead wires 12a, 12b was provided for evaluating the transducer.

Examples 10-13 and Comparative Examples 9-10

In Example 9, a similar procedure was carried out to produce a polymer transducer, except that the pastes obtained in Examples 5, 6 and 8, and Comparative Example 1 were used instead of the paste which was used for forming the electrode film and the electrolyte film. Combination of the electrolyte film and electrode film are shown in Tables 5 and 6.
(Performance Test of Polymer Transducer as Deformation Sensor)

Figure 3:
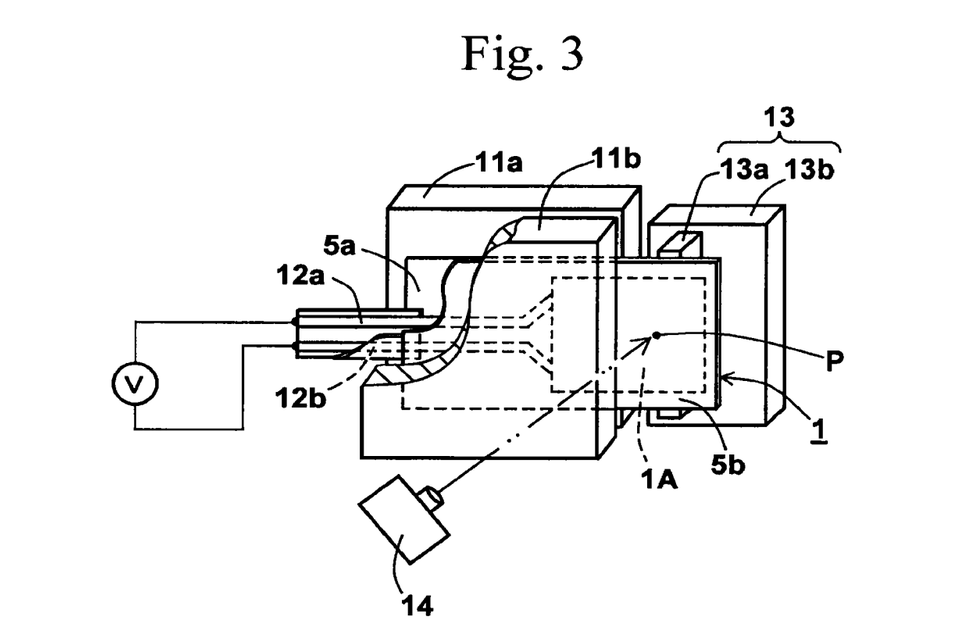
FIG. 3 is an overview figure showing how to measure the performance of the polymer transducer of the present invention.

Response sensitivity of a deformation sensor is defined as a voltage generated at a time when a certain displacement is given to the polymer transducer. An outline of performance test is shown in FIG. 3. In a measuring cell having a polymer transducer obtained in Examples 9-13 and Comparative Examples 9-10, a portion having a length of 10 mm in the length direction from the end of a sensor 1 A (20 mm×20 mm) was fixed with clamps 11a, 11b, thereby the remaining portion having a length of 10 mm (deformation sensor portion) was left as a free end portion. The lead wires 12a, 12b were connected to a voltmeter (NR-ST04, Trade name, produced by Keyence Corporation). Under this condition, displacement of 1 mm caused by a vibration plate 13b of a displacement generator 13 was given through a drive transmission member 13a to a position 5 mm away from the fixed end of the polymer transducer 1, thereby a voltage was generated. The generated voltage was measured by a data logger. At this time, the amount of displacement at the displacement point 5 mm away from the fixed end of the polymer transducer 1 was simultaneously measured using a Laser displacement meter (LK-G155, Trade name, produced by Keyence Corporation) 14. The deformation was released after 20 seconds from the start of the deformation. A signal strength (S0) which was calculated by dividing the generated voltage measured just after the deformation by the amount of deformation measured by the Laser displacement meter, a signal strength (S20) which was calculated by dividing the generated voltage measured after 20 seconds from the start of the deformation by the amount of deformation measured by the Laser displacement meter and a signal retention rate=(S20/S0)×100 (%), are measured. As for S0 and S20, higher values are more desirable. As for the signal retention rate, the rate closer to 100% is more desirable. The results for Examples 9-13 and Comparative Examples 9-10 are shown in Tables 5 and 6.

TABLE 5

|  | Ex. 9 | Ex. 10 | Ex. 11 | Ex. 12 | Ex. 13 |
| --- | --- | --- | --- | --- | --- |
| Electrolyte film paste | I-1 | I-1 | Comp. I-1 | Comp. I-1 | Comp. I-1 |
| Particle in electrolyte C | Glass beads | Glass beads | None | None | None |
| Paste for electrode | Comp. II-1 | II-1 | II-1 | II-2 | II-4 |
| Particle in electrode C | None | Glass beads | Glass beads | Cross-linked PMMA (1) | Cross-linked PS |
| S0 (mV/mm) | 0.095 | 0.090 | 0.120 | 0.096 | 0.110 |
| S/20 (mV/mm) | 0.083 | 0.087 | 0.108 | 0.089 | 0.104 |
| S20/S0 (%) | 87 | 97 | 90 | 94 | 95 |

TABLE 6

|  | Comp. Ex. 9 | Comp. Ex. 10 |
| --- | --- | --- |
| Paste for electrolyte film | Comp. I-1 | Comp. I-4 |
| Particle in electrolyte (C) | None | Grass fiber |
| Paste for electrode | Comp. II-1 | Comp. II-4 |
| Particle in electrode (C) | None | Grass fiber |
| S0 (mV/mm) | 0.084 | Not measurable |
| S/20 (mV/mm) | 0.082 | Not measurable |
| S20/S0 (%) | 98 | Not measurable |

The polymer transducer having an electrolyte film and electrode film, at least one of which was produced from the paste of the present invention, showed an excellent retention rate (S20/S0) and also was a sensor well capable to monitor a deformation state. When compared to Comparative Example 9 in which a paste different from the paste of the present invention was used, the present polymer transducer showed an equal signal retention rate and also showed greater signal strength (S0 and S20), being suitable for use.

It is hard to say that a polymer transducer, which was produced from different particles (C) different from non-dissociable particles (C) that met the requirement of the present invention, had sufficient flexibility.

In Comparative Example 10, a signal which was regarded as a response signal to the deformation was not observed. There were a number of noises but no signal was measured. After the measurement, a crack was visually observed at its bend region of the polymer transducer.

INDUSTRIAL APPLICABILITY

The pastes of the present invention show characteristics suitable for printing process. They are useful as electrolyte or electrode materials for polymer transducers. The coating films obtained by coating and drying the pastes suitable for forming electrolyte films can be used as electrolyte film for polymer transducers. And coating films obtained by coating and drying the pastes suitable for electrode films can be used as electrode films for polymer transducers. The films are used for polymer transducers having sufficient flexibility and high response sensitivity, and the polymer transducers of the present invention are suitably used for measuring various deformations and displacements as flexible sensors.

What is claimed is:

1. A paste which comprises:
    a solid polymer electrolyte (A) consisting of a block copolymer containing;
        a polymer block (a-1) having a unit represented by following formula (1)

(in the formula, $R^1$ is a hydrogen atom, a linear or branched alkyl group having a carbon number of 1-8, or an aryl group having a carbon number of 6-14; $R^2$ is an alkylene group having a carbon number of 1-10, an arylene group having a carbon number of 6-14 which may have 1-3 substituents, or a polyalkylene glycol group which may have a substituent, or direct bonding; $R^3$ is an alkyl group or alkoxy group having a carbon number of 1-4; an anion $Y^-$ which corresponds to the hydrogen ion $H^+$ is connected to an aromatic ring by way of $R^2$; n=1-3, m=0-4, and $1 \leq m+n \leq 5$), and a rubber-like, at a room temperature, polymer block (a-2) having substantially no ion group;

an organic solvent (B) having a boiling point of 150° C. or higher; and non-dissociable particles (C) which is insoluble in the organic solvent (B) and has a major axis of 1-100 μm and an aspect ratio of 5 or less.

2. The paste according to claim 1, wherein the anion $Y^-$ is selected from a carboxylic acid anion, sulfonic acid anion and phosphoric acid anion.

3. The paste according to claim 1, wherein the non-dissociable particles (C) is non-dissociable polymer particles.

4. The paste according to claim 1, wherein the non-dissociable particles (C) is selected from particles of a crystalline polymer, particles of a cross-linked polymer and inorganic particles.

5. The paste according to claim 1, wherein the paste contains conductive fine particles (D) whose average particle diameter is 1/50 times or less the length of the major axis of the non-dissociable particles (C).

6. The paste according to claim 5, wherein the conductive fine particles (D) is selected from metal fine particles, metal compound fine particles, a conductive carbon fine particle and a powder of a conductive polymer.

7. An electrolyte film being formed into a film-like shape by drying and solidifying the paste according to claim 1.

8. An electrode film being formed into a film-like shape by drying and solidifying the paste according to claim 5.

9. A polymer transducer comprises:
    at least one electrolyte film; and
    at least a pair of electrode films between which the electrolyte film is sandwiched, wherein at least either one of the electrolyte film and the electrode film that contains conductive fine particles (D) is a coating film produced by drying and solidifying a paste which comprises:
        a solid polymer electrolyte (A) consisting of a block copolymer containing;
            a polymer block (a-1) having a unit represented by following formula (1)

(in the formula, $R^1$ is a hydrogen atom, a linear or branched alkyl group having a carbon number of 1-8, or an aryl group having a carbon number of 6-14; $R^2$ is an alkylene group having a carbon number of 1-10, an arylene group having a carbon number of 6-14 which may have 1-3 substituents, or a polyalkylene glycol group which may have a substituent, or direct bonding; $R^3$ is an alkyl group or alkoxy group having a carbon number of 1-4; an anion $Y^-$ which corresponds to the hydrogen ion $H^+$ is connected to an aromatic ring by way of $R^2$; n=1-3, m=0-4, and $1 \leq m+n \leq 5$), and a rubber-like (at a room temperature) polymer block (a-2) having substantially no ion group;

an organic solvent (B) having a boiling point of 150° C. or higher; and non-dissociable particles (C) which is insoluble in the organic solvent (B) and has a major axis of 1-100 μm and an aspect ratio of 5 or less.

* * * * *